3,741,945
VINYL ALCOHOL COPOLYMERS CONTAINING HYDROXY SULFONYL GROUPS

Guy Bourat, Bourg-la-Reine, and Rodolphe Margraff, Ris-Orangis, France, assignors to Rhone-Poulenc S.A., Paris, France
No Drawing. Continuation of abandoned application Ser. No. 821,947, May 5, 1969. This application Aug. 27, 1971, Ser. No. 175,693
Int. Cl. C08f 27/06, 47/00
U.S. Cl. 260—79.3 R           14 Claims

ABSTRACT OF THE DISCLOSURE

Vinyl alcohol copolymers partially etherified with hydroxy sulphonyl organic radicals and optionally partially crosslinked by ether groups are useful in making cation-exchange membranes.

---

This application is a continuation of our application Ser. No. 821,947 field May 5, 1969, now abandoned.

The present invention relates to vinyl alcohol copolymers, and the preparation of such copolymers.

It has been proposed to prepare ion exchange membranes by dispersing an ion exchanger in a particle form in a polymer serving as a binder. Such membranes, known as heterogeneous membranes, suffer from numerous disadvantages resulting from their structure. It is difficult to disperse the ion exchanger uniformly in the polymer binder. The result of this is to create within the membrane zones of high concentration of ion exchange groups and zones of low concentration of these same groups, and when the membrane is used differences in the absorption of ions result, which cause considerable strains and tensions. Furthermore, the electrical conductivity of these membranes is relatively low.

In order to ameliorate these disadvantages, it has been proposed to manufacture homogeneous ion exchange membranes in which the ion exchange groups are carried by the film-forming polymer itself. This objective is achieved by polymerising or copolymerising a monomer possessing an ion exchange radical (for example p-vinylbenzenesulphonic acid) or a radical which can be converted to an ion exchange radical by a conventional method (for example p-chloromethylstyrene). In general, in order to impart adequate mechanical properties to the membrane, a divinyl or polyvinyl monomer (divinylbenzene) is added to the monomers used to produce, by crosslinking, a three dimensional network of bonds between the polymer chains forming the membrane. By virtue of their rigidity these membranes also are subject to internal tensions, especially in the dry state, which cause crazing or cracking of the material.

Ion exchange membranes have also been prepared by casting homogeneous solutions of a film-forming polymer (e.g. a vinyl chloride/acrylonitrile copolymer) and a polyelectrolyte in a joint solvent (U.S. Pat. No. 3,004,909). However the products obtained are not satisfactory because the polyelectrolyte, not being linked to the film-forming polymer, can be progressively extracted from the membrane during its use.

The present invention provides vinyl alcohol copolymers partially etherified by substituted or unsubstituted hydroxysulphonyl organic radicals and optionally partially crosslinked by

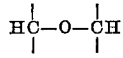

linkages. Such copolymers can be used as cation exchange resins possessing excellent mechanical and electrical properties. According to a feature of the invention, these copolymers are obtained by reacting the vinyl alcohol copolymer in solution with one or more sultones.

The starting copolymers are vinyl alcohol copolymers with one or more ethylenically unsaturated monomers. Ethylene, vinyl chloride and vinyl acetate are advantageously used as the unsaturated monomers. The percentage by weight of vinyl alcohol (or hydroxyethylene) units

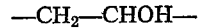

in the copolymer is usually 5 to 60% and preferably 15 to 30% by weight of the unetherified copolymer. The preparation of such copolymers has been described in U.S. Pat. No. 2,386,347 and in French Pat. No. 1,401,550. It is possible partially to crosslink these copolymers by thermal dehydration or by acetalisation.

The sultones which can be used are monosultones or polysultones, generally mono- or di-γ-sultones which introduce hydroxysulphonylalkyl or bis(hydroxysulphonyl) alkylene radicals. Examples of suitable mono-γ-sultones are those substituted by an alkyl radical at the carbon atom linked to the oxygen atom, e.g. propenesultone, which is preferably used, especially because of its high reactivity and introduces the radical of formula:

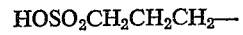

Suitable di-γ-sultones are 1,2-bis(p-nitro-o-sulphophenyl)-ethanediol-1,2 [Ruggli et al., Helv. Chim. Acta 9 929–50 (1926)], methylene di-naphthosultone [Schetty, Helv. Chim. Acta 31, 1229 (1948)], di-naphthosultone [Allport., J. Chem. Soc. 1958 4090–4], and especially the di-γ-sultone of 2,2-bis(hydroxymethyl)-propane-1,3-disulphonic acid [Goethals et al., Bull. Soc. Chim. Belge 70 218–20 (1961)] referred to hereinafter as spirobi-2:2′-propanesultone, which introduces the radical of formula:

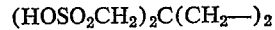

In the process of the invention, a sultone group reacts with the hydroxyl group of the —CH₂—CHOH— unit, with the opening of the sultone ring, and the formation of a —SO₃H radical and an ether bond. If several groups of a polysultone react, crosslinking of the starting polymer occurs. Further more, sultones favour dehydration between —CH₂—CHOH— units, and thus

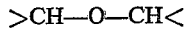

linkages are formed. Thus it is possible to use only monosultones to obtain copolymers according to the invention.

The reaction of the sultone or sultones with the vinyl alcohol copolymer is generally effected in a common solvent for the copolymer and the sultone.

To prepare membranes consisting of the copolymers of the invention, a support of varying geometry, having the shape desired for the final membrane, is in practice coated with a solution containing the vinyl alcohol copolymer and the sultone or sultones. This coating is generally achieved by spreading this solution on the support. It is thus possible to prepare membranes in the form of foils, bags or tubes. Generally, the membranes needed are flat membranes. In order to obtain reinforced membranes, the solution can also be spread on a screen or a woven fabric. In all these cases a liquid film is obtained after spreading, and is heated to a temperature which is usually from 80° to 150° C., and 100° C. to 120° C. It is possible to spread the solution on a surface which has been heated beforehand.

As the solvent which dissolves the vinyl alcohol copolymer and the sultone or sultones it is, for example, possible to use a mixture of two substances of which one has a higher polarity than the other, for example mixtures of cyclohexanone and dioxane, or of xylene and dimethylsulphoxide, in proportions by weight of between 40/60 and 60/40. However, hexaalkylphosphotriamides, and more particularly hexamethylphosphotriamide, which simultaneously act as good solvents for the vinyl alcohol copolymers and the sultones, are preferably used.

According to a particularly advantageous method of carrying out the invention, a disultone and a monosultone are successively reacted with the vinyl alcohol copolymer. The numerical proportion of molecules of disultone based on the number of hydroxyethylene units of the copolymer should be from 10% to 200%, and preferably 25 to 150%. The numerical proportion of molecules of monosultone based on the number of hydroxyethylene units of the starting copolymer is from 5 to 100%, preferably 30 to 75%.

In this two-stage process, the disultone is first reacted with the vinyl alcohol copolymer in solution. The monosultone is then added to the solution obtained and caused to react by simple heating. It is obviously appropriate to cast the solution rather rapidly after introducing the monosultone so as to avoid premature gelling of the mixture.

The solvent contained in the liquid film obtained is evaporated. Where hexamethylphosphotriamide is used, drying advantageously takes place at a temperature of 100° to 120° C. under atmospheric pressure and for a period of between 2 and 12 hours. A solid film or membrane is thus obtained.

The compounds of low molecular weight, and more particularly the water-soluble sulphonic compounds which may be present, may be removed from the membrane, by first immersing the membrane in hot water and then in a hot aqueous alkaline solution of a concentration below 2 N and preferably below N.

The membranes obtained are generally supple and can be stored dry without losing their mechanical properties. They simultaneously possess excellent permeation selectivity and a low resistance to the passage of an electric current. The combination of these properties makes it particularly advantageous to use them in electrodialysis and in fuel piles of the type usually called "low temperature hydrogen-oxygen piles".

The examples which follow illustrate the invention.

EXAMPLE 1

2 g. of an ethylene-vinyl alcohol copolymer, obtained by total saponification of an ethylene-vinyl acetate copolymer containing 40% by weight of acetoxyethylene units and having a reduced viscosity of 87 cm.$^3$/g. in a 5 g./litre solution in toluene at 25° C., are dissolved with stirring in 30 cm.$^3$ of hexamethylphosphotriamide heated to 115° C. 3 g. of spirobi-2:2′-propanesultone are added and the stirring and temperature are maintained for 2 hours. 1 g. of propanesultone is then added, the mixture is kept at 115° C. for 5 minutes, and the solution is then spread on a 20 cm. x 20 cm. glass plate arranged horizontally in a ventilated oven heated to 115° C. After remaining for 10 hours in this oven, the plate is cooled to 20° C. and then dipped in water heated to 80° C. The membrane detaches itself from the plate and is steeped for 8 hours in a normal aqueous potassium hydroxide solution heated to 95° C. by a water bath. The membrane is then washed with water until the wash waters are no longer alkaline. Its theoretical exchange capacity as deduced from its sulphur content is 0.9 milliequivalent/g. of dry resin. The dry membrane is translucent and supple even in the dry state. Its permeation selectivity, measured between 2 KCl solutions respectively 0.8 and 0.4 M, is 0.91. Its electrical substitution resistance in an 0.6 M KCl medium is 2Ω cm.$^2$ (the electrical substitution resistance of a given membrane surface is the variation in electrical resistance of a liquid column if the membrane is substituted for a slice of liquid of the same thickness and the same surface area as the membrane, in a position at right angles to the axis of the column).

EXAMPLES 2 TO 6

The conditions of Example 1 are used, with the respective contents of vinyl alcohol-ethylene copolymers, spirobi-2:2′-propanesultone and propanesultone being varied. The table which follows indicates these various contents and the results obtained.

| | Weight of— | | | | |
|---|---|---|---|---|---|
| Example | Copolymer in grams | Disultone in grams | Monosultone in grams | Percent S in dry product | Substitution [1] |
| 2 | 2.5 | 3.75 | 1.25 | 2.2 | 2.5 |
| 3 | 2 | 1 | 0.5 | 2.2 | 6 |
| 4 | 2 | 0.5 | 1 | 2.3 | 2.5 |
| 5 | 2 | 2 | 0.5 | 4.5 | 6 |
| 6 | 2 | 1.5 | 1 | 3.8 | 2.5 |

[1] Resistance in an 0.6 M KCl medium (Ω cm.$^2$).

These membranes are translucent and supple even in the dry state.

EXAMPLE 7

The procedure of Example 1 is followed, replacing the ethylenevinyl alcohol copolymer by a copolymer obtained by total saponification of a vinyl chloride-vinyl acetate copolymer containing 42% by weight of acetyloxyethylene units and having a reduced viscosity of 56 cm.$^3$/g. in a 5 g./l. solution in cyclohexanone at 25° C. 2 g. of spirobi-2:2′-propanesultone and 1 g. of propanesultone are added per 4 g. of copolymer. The resulting membrane contains 2.2% of sulphur. Its electrical substitution resistance in an 0.6 M KCl medium is 1.3 Ω cm.$^2$. Its permeation selectivity between 2 KCl solutions, respectively 0.8 and 0.4 M, is 0.85.

What is claimed is:

1. Shaped or unshaped vinyl alcohol copolymers comprising recurring units derived from an ethylenically unsaturated monomer and recurring units of the formula:

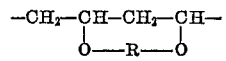

in which R represents a hydrocarbon radical selected from an alkyl radical, an aryl radical and an aryl radical substituted by a nitro group, said radical having 5 to 21 carbon atoms and carrying two hydroxysulphonyl groups, the oxygen atoms attached to the hydrocarbon radical R being attached to different carbon atoms of the said radical R.

2. Shaped or unshaped vinyl alcohol copolymers according to claim 1 which contain recurring units of the formula:

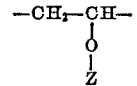

in which Z represents a hydrocarbon radical carrying one hydroxylsulphonyl radical.

3. Shaped or unshaped vinyl alcohol copolymers according to claim 1 which contain radicals of the formula:

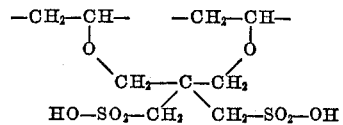

4. Shaped or unshaped vinyl alcohol copolymers according to claim 3 which contain radicals of the formula:

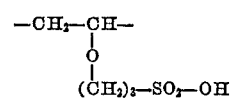

5. A copolymer according to claim 1 which is also partially cross-linked by

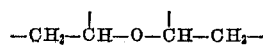

linkages.

6. A copolymer according to claim 1 consisting of units of vinyl alcohol and of one or more of ethylene, vinyl chloride and vinyl acetate.

7. A copolymer according to claim 1 in which the proportion of —CH₂CHOH— and

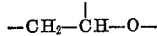

units in the copolymer is 5–60% by weight.

8. A copolymer according to claim 7 in which the proportion is 15–30%.

9. A copolymer according to claim 1 in the form of a membrane.

10. Process for the preparation of a membrane of vinyl alcohol copolymer partially etherified by hydrocarbon radicals selected from alkyl radicals, aryl radicals and aryl radicals substituted by nitro groups, said radicals each containing 5 to 21 carbon atoms and carrying two hydroxysulphonyl groups, which comprises reacting the vinyl alcohol copolymer in solution in a solvent with one or more disultones each containing 5 to 21 carbon atoms per molecule, casting the resulting solution and evaporating it.

11. Process according to claim 10 in which after the said reaction the vinyl alcohol copolymer in solution is further reacted with a monosultone.

12. Process according to claim 10 in which the reaction is carried out at a temperature from 80° to 190° C.

13. Process according to claim 11 in which the numerical proportion of molecules of disultone based on the number of hydroxyethylene units of the copolymer is 25 to 150% and the numerical proportion of molecules of monosultone based on the number of hydroxyethylene units of the copolymer is 30 to 75%.

14. Process according to claim 10, in which the solvent is hexamethylphosphatriamide.

References Cited
UNITED STATES PATENTS

| | | | |
|---|---|---|---|
| 3,322,855 | 5/1967 | Fukishima | 260—874 |
| 3,388,072 | 6/1968 | Domba | 252—321 |
| 3,475,364 | 10/1969 | Trapasso | 260—32.6 |

JOSEPH L. SCHOFER, Primary Examiner

C. A. HENDERSON, JR., Assistant Examiner

U.S. Cl. X.R.

136—87; 210—500; 260—2.2 R, 30.4 R, 30.4 N, 30.6 R, 30.8 DS, 32.8 R, 32.8 N, 33.6 UA, 91.3 VA